(12) United States Patent
Li

(10) Patent No.: US 10,826,301 B2
(45) Date of Patent: Nov. 3, 2020

(54) SELF POWER-GENERATING DEVICE

(71) Applicant: E-free power technology, Inc

(72) Inventor: Xiyue Li, Yinchuan (CN)

(73) Assignee: E-FREE POWER TECHNOLOGY, LNC, Cary, NC (US)

(*) Notice: Subject to any disclaimer, the term of this patent is extended or adjusted under 35 U.S.C. 154(b) by 331 days.

(21) Appl. No.: 15/919,240

(22) Filed: Mar. 13, 2018

(65) Prior Publication Data
US 2018/0262020 A1 Sep. 13, 2018

(30) Foreign Application Priority Data
Jan. 10, 2018 (CN) .......................... 2018 1 0023782

(51) Int. Cl.
H02J 7/04 (2006.01)
H02J 7/16 (2006.01)
H02J 7/00 (2006.01)
H02J 7/34 (2006.01)
B60L 53/20 (2019.01)
B60L 50/40 (2019.01)
H02J 7/14 (2006.01)

(52) U.S. Cl.
CPC ............ H02J 7/0013 (2013.01); B60L 50/40 (2019.02); B60L 53/20 (2019.02); H02J 7/14 (2013.01); H02J 7/345 (2013.01); Y02T 10/70 (2013.01)

(58) Field of Classification Search
CPC ................................................... H02J 2207/20
USPC ......................................................... 320/140
See application file for complete search history.

(56) References Cited

U.S. PATENT DOCUMENTS

| | | | |
|---|---|---|---|
| 10,252,626 B2* | 4/2019 | Tajima ................ | H02J 7/0029 |
| 10,541,549 B2* | 1/2020 | Sato .................... | B60L 53/20 |
| 2005/0168073 A1* | 8/2005 | Hjort ................... | H02J 9/062 |
| | | | 307/65 |
| 2006/0213890 A1* | 9/2006 | Kooken ............... | H02M 3/158 |
| | | | 219/130.21 |
| 2008/0061628 A1* | 3/2008 | Nielsen ............... | H02J 9/062 |
| | | | 307/66 |
| 2009/0085526 A1* | 4/2009 | Smith .................. | H02J 7/00711 |
| | | | 320/139 |
| 2018/0219479 A1* | 8/2018 | Kaiser ................. | B64D 41/00 |

(Continued)

Primary Examiner — Samuel Berhanu
(74) Attorney, Agent, or Firm — Bayramoglu Law Offices LLC

(57) ABSTRACT

A self power-generating device for electric vehicles includes a positive charge generating converter, a negative charge generating converter, a transformer and batteries. One end of the positive charge generating converter is provided with a first electrode, the other end of the positive charge generating converter is provided with a second electrode. One end of the negative charge generating converter is provided with a third electrode, the other end of the negative charge generating converter is provided with a fourth electrode. The positive charge generating converter is serially connected to a first capacitor through wire. The negative charge generating converter is serially connected to the second capacitor through wire. The positive charge generating converter, the negative charge generating converter, the first capacitor and the second capacitor form a closed loop and the closed loop is coupled to the primary coil of the transformer to charge the battery.

7 Claims, 2 Drawing Sheets

(56) References Cited

U.S. PATENT DOCUMENTS

2018/0294732 A1* 10/2018 Ye .................... H02M 3/33569
2018/0342958 A1* 11/2018 Ji ......................... H02M 1/088

* cited by examiner

SELF POWER-GENERATING DEVICE

CROSS REFERENCE TO RELATED APPLICATIONS

This application is based upon and claims priority to Chinese Patent Application 201810023782.9 filed on Jan. 10, 2018, the entire content of which is incorporated herein by reference.

TECHNICAL FIELD

The present invention relates to the field of new energy technologies, in particular to a self power-generating device.

BACKGROUND

The energy resources refer to substances that are enabled to provide power conversion to natural world such as mineral energy resources, nuclear physical energy resources, atmospheric circulation energy resources, geographical energy resource etc. Energy resources are the material basis of human activities.

Since elements for producing energy such as coal, and oil are depleting day by day, solar panels are expensive and limited by the availability of light, hydroelectric power generation requires height differences, wind power generation is affected by the environment, and the tidal power technology is under developed etc., human society is facing a serious energy crisis. The ecological environment and people's livelihood related industrial production for countries are significantly affected. Even worse, international disputes and wars are triggered because of the competition of energy resources. Therefore, the exploration of energy resources is essential for the development of human societies.

The method that electricity is used as power and supplied to a motor for driving is widely used at present. In such a manner, battery is configured to store power and used as power source. The motor is driven to operate as the battery supplies power to the motor. At present, the types of batteries mainly include lead-acid batteries, nickel-cadmium batteries, nickel-hydrogen batteries and lithium-ion batteries etc.

However, the existing batteries can only store a small amount of energy per unit mass. The battery can merely serve as a carrier of electrical energy storage and is not enabled to cyclically generate electrical energy by itself. The production of electrical energy is relied on external input as the battery cannot continuously provide energy for a long period of time, thereby severely limiting the application fields of the batteries. Moreover, it is difficult to form batteries at an economical scale, and the popularization of application and the promotion are extremely difficult. Therefore, a self power-generating device is provided by the present invention.

SUMMARY OF THE INVENTION

The objectives of the present invention are to provide a self power-generating device to solve the problems of the energy crisis and small amount of energy storage in a battery per unit mass etc. proposed in the foregoing background art.

In order to realize the above objectives, the present invention provides the following technical solutions:

A self power-generating device for an electric vehicle includes a positive charge generating converter, a negative charge generating converter, a transformer and batteries. One end of the positive charge generating converter is provided with a first electrode, and the other end of the positive charge generating converter is provided with a second electrode. One end of the negative charge generating converter is provided with a third electrode, and the other end of the negative charge generating converter is provided with a fourth electrode. The positive charge generating converter is serially connected to a first capacitor through a wire. The negative charge generating converter is serially connected to a second capacitor through a wire. The positive charge generating converter, the negative charge generating converter, the first capacitor and the second capacitor form a closed loop, and the closed loop is coupled with the primary coil of the transformer. Further, the transformer is electrically connected to the battery through a high-frequency pulse charging circuit to charge the batteries.

Preferably, both the positive charge generating converter and the negative charge generating converter are metal conductors. Both the positive charge generating converter and the negative charge generating converter are grounded through a wire, so that the positive charges and the negative charges are gathered at a far end in the earth.

Preferably, the high-frequency pulse charging circuit includes a VD1-VD4 bridge rectifier circuit and an eight-pin time-base integrated circuit NE555. The first pin of the NE555 is grounded, the third pin is serially connected with a LED light, and the eighth pin is connected to a voltage stabilizing circuit composed of VZ and C1.

Preferably, the positive electrodes and negative electrodes of the positive charge generating converter and the negative charge generating converter are opposite.

Preferably, at least two batteries are provided, and the batteries are serially connected to each other.

Preferably, both the first capacitor and the second capacitor are super-capacitors.

Preferably, the first electrode and the second electrode alternately charge the first capacitor. The third electrode and the fourth electrode alternately charge the second capacitor.

Compared with the prior art, the present invention has the following advantages. The positive charge generating converter and the negative charge generating of the self power-generating device converter each has two electrodes, one electrode is used to collect positive charges, the other electrode is used to collect negative charges. The two electrodes alternately charge the respective capacitor. When the voltage of capacitor is high enough, the spark gap is broken down. After passing through the safety gap, the capacitor can be regularly discharged. The oscillatory discharge is coupled to the primary coil of the transformer, so that the charges can produce dynamic electrical energy. The oscillatory high-frequency high-voltage electrical energy is converted into applicable voltage by the transformer so as to charge the battery, and form a recyclable loop. By doing so, the problem that the battery must rely on the external input to produce electrical energy can be effectively and distinctly solved and the objective that the battery can supply electrical energy continuously in a long period of time can be achieved. Moreover, the batteries of the electric vehicles can automatically generate electricity without any external objects, thus greatly reducing energy consumption.

Figure 1:
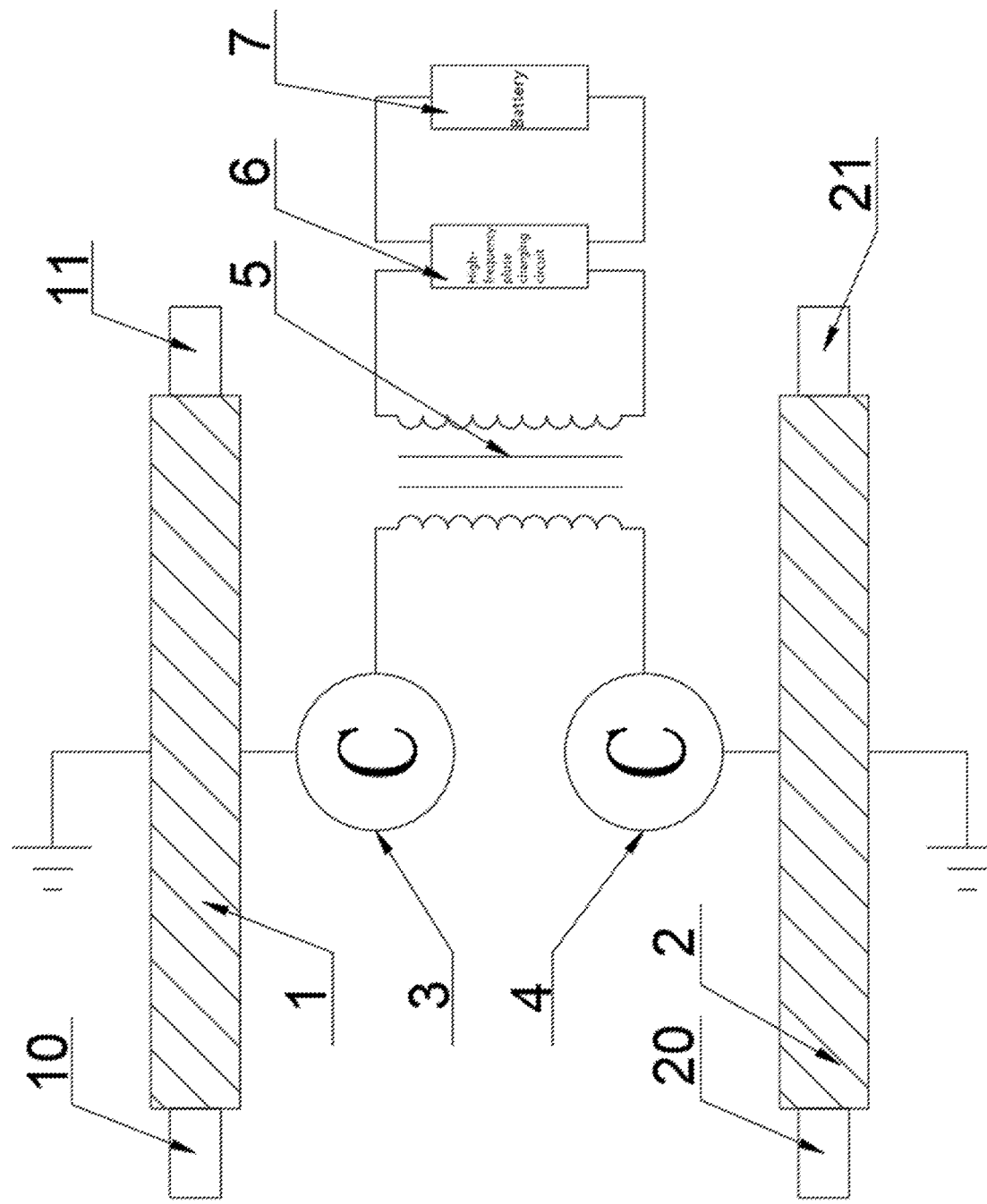
FIG. 1 is a schematic diagram of the overall circuit of the present invention.

As shown in the drawings: 1, positive charge generating converter; 10, first electrode; 11, second electrode; 2, negative charge generating converter; 20, third electrode; 21, fourth electrode; 3, first capacitor 4, second capacitor; 5, transformer; 6, high-frequency pulse charging circuit; 7, battery.

DETAILED DESCRIPTION OF THE INVENTION

The technical solutions in the embodiments of the present invention will be described clearly and completely hereinafter with reference to the drawings in the embodiments of the present invention. Apparently, the described embodiments are merely partial rather than all embodiments of the present invention. All other embodiments derived by those of ordinary skill in the art based on the embodiments of the present invention without creative efforts shall fall within the protection scope of the present invention.

Figure 2:
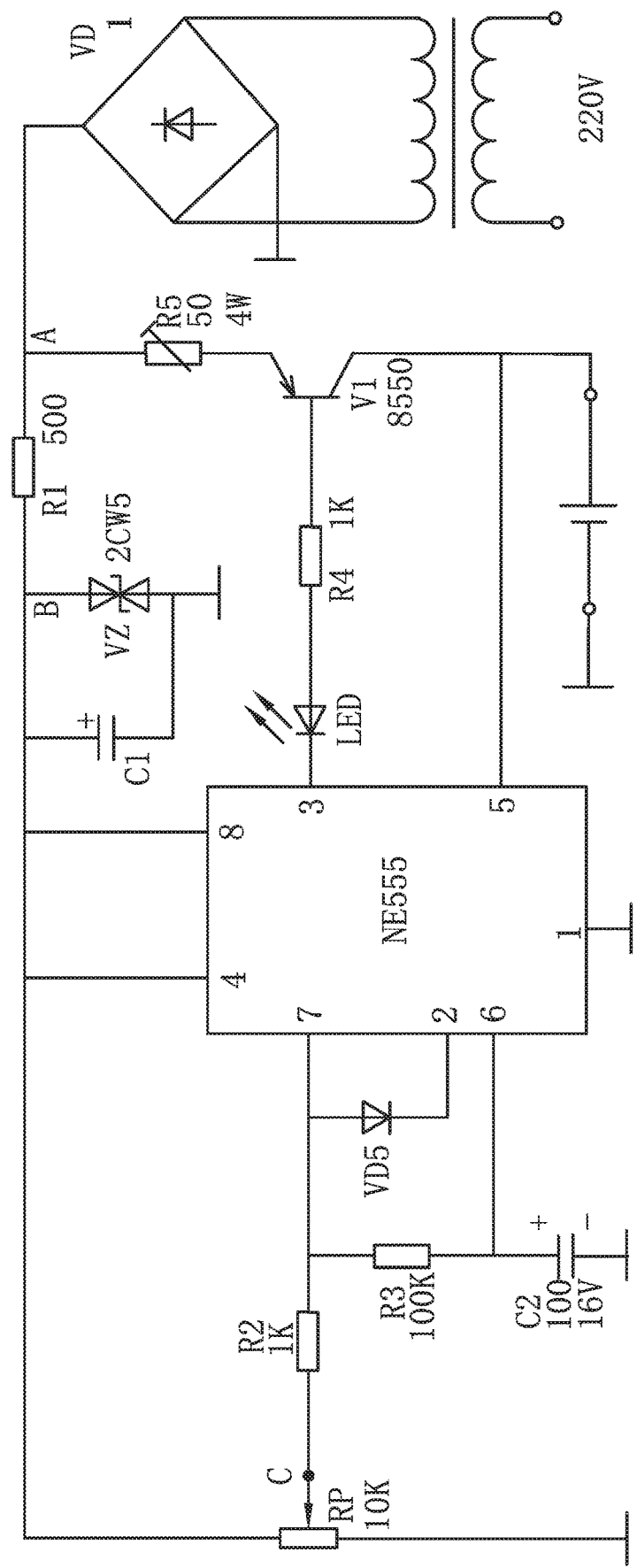
FIG. 2 is a circuit diagram of the high-frequency pulse charging circuit of the present invention.

Referring to FIG. 1-2, a technical solution is provided by the present invention.

A self power-generating device for an electric vehicle includes a positive charge generating converter 1, a negative charge generating converter 2, a transformer 5 and batteries 7. One end of the positive charge generating converter 1 is provided with a first electrode 10, and the other end of the positive charge generating converter 1 is provided with a second electrode 11. One end of the negative charge generating converter 2 is provided with a third electrode 20. The positive electrodes and negative electrodes of the positive charge generating converter 1 and the negative charge generating converter 2 are opposite. The other end of the negative charge generating converter 2 is provided with a fourth electrode 21. The positive charge generating converter 1 and the negative charge generating converter 2 are both metal conductors. The positive charge generating converter 1 and the negative charge generating converter 2 are both grounded through wires so that positive and negative charges are gathered at the far end in the earth. One end of a metal body near negative charges would gather positive charges which are attracted by the negative charges. Meanwhile, due to the theory of electrostatic equilibrium, the negative charges will be induced at the other end of the metal body, and this end is grounded to form a unity with the earth, so that the negative charges would gather at the far end in the earth, and the conductor is positively charged. The positive charge generating converter 1 is serially connected to a first capacitor 3 through a wire. The negative charge generating converter 2 is serially connected to a second capacitor 4 through a wire. Both the first capacitor 3 and the second capacitor 4 are super-capacitors. The first electrode 10 and the second electrode 11 alternately charge the first capacitor 3. The third electrode 20 and the fourth electrode 21 alternately charge the second capacitor 4. The positive charge generating converter 1, the negative charge generating converter 2, the first capacitor 3 and the second capacitor 4 form a closed loop and the closed loop is coupled to the primary coil of the transformer 5. The transformer 5 is also electrically connected to the battery 7 through the high-frequency pulse charging circuit 6 to charge the battery 7. There are at least two batteries 7. The batteries are serially connected to each other. The positive charge generating converter 1 and the negative charge generating converter 2 each has two electrodes, one electrode is used to collect positive charges, and the other electrode is used to collect negative charges. The two electrodes charge the respective capacitor, alternately. When the voltage of the capacitor is high enough, the spark gap is broken down. After passing through the safety gap, the capacitor can be regularly discharged. The oscillatory discharge is coupled to the primary coil of the transformer, so that the charges can produce dynamic electrical energy. The oscillatory high-frequency high-voltage electrical energy is converted into the applicable voltage by the transformer 5 so as to charge the battery 7 and form a recyclable circuit. The problem that the battery 7 must rely on the external input to produce electrical energy can be effectively and distinctly solved and the objective that the battery 7 can supply electrical energy continuously in a long period of time can be achieved. The high-frequency pulse charging circuit 6 is composed of a VD1~VD4 bridge rectifier circuit and an eight-pin time-base integrated circuit NE555. The first pin of the NE555 is grounded, the third pin is serially connected to a LED light, the eighth pin is connected to a voltage stabilizing circuit composed of VZ and the C1. After the voltage is converted into normal voltage by the transformer 5, with the VD1~VD4 bridge rectifier circuit, the voltage at point A is about 20V. With the current limiting of R1 and the voltage stabilizing of VZ, C1, a stable voltage obtained at point B is about 14V which is supplied to the NE555 for operation and produce oscillation. The control signals are output from the third pin to control the charging of the battery 7. Meanwhile, a reference potential is established at point C by adjusting the RP. When the C2, which is used as the oscillation element, is in charge state, the third pin of NE555 outputs high level, then the LED light is off, and the V1 is cut off, so the power source subsequently stops charging the battery. When the voltage on C2 is gradually rising to exceed the voltage of the fifth pin, the internal circuit is triggered, and the seventh pin is shorted to the ground. During the discharging to ground of C2, the third pin of the NE555 turns into low level, so that the LED light is on, the V1 is on, and the battery 7 starts charging. When the voltage of C2 is lower than a half of the voltage of the fifth pin due to discharge, the internal circuit is reversed again. The seventh pin is disconnected from the ground, the C2 starts charging, and the third pin turns into high level again.

The basic principles, main features and advantages of the present invention have been shown and described above. It should be understood by those skilled in the art that the present invention is not limited to the foregoing embodiments, and the foregoing embodiments and the description described above are merely preferred embodiments of the present invention which are not intended to limit the present invention. Without departing from the spirit and scope of the present invention, there are various changes and modifications of the present invention. Such changes and modifications shall fall within the scope of the claimed invention. The scope of protection demanded by the present invention is defined by the appended claims and their equivalents.

The invention claimed is:

1. A power-generating device for electrical vehicles comprising
 a positive charge generating converter;
 a negative charge generating converter;
 a transformer; and
 a battery; wherein
 a first end of the positive charge generating converter is provided with a first electrode;
 a second end of the positive charge generating converter is provided with a second electrode;
 wherein the first electrode is used to collect positive charges and the second electrode is used to collect negative charges;

a first end of the negative charge generating converter is provided with a third electrode;

a second end of the negative charge generating converter is provided with a fourth electrode;

wherein the third electrode is used to collect positive charges and the fourth electrode is used to collect negative charges;

the positive charge generating converter is serially connected to a first capacitor through wire;

the negative charge generating converter is serially connected to a second capacitor through wire;

the positive charge generating converter, the negative charge generating converter, the first capacitor and the second capacitor form a closed loop;

the closed loop is coupled to a primary coil of the transformer; and the transformer is electrically connected to the battery through a high-frequency pulse charging circuit to charge the battery.

2. The power-generating device according to claim 1, wherein the positive charge generating converter and the negative charge generating converter are metal conductors; and the positive charge generating converter and the negative charge generating converter are grounded through wires, so that the positive and negative charges are gathered at a far end in the earth.

3. The power-generating device according to claim 2, wherein the high-frequency pulse charging circuit comprises a bridge rectifier circuit and an eight-pin time-base integrated circuit;

a first pin of the eight-pin time-base integrated circuit is grounded;

a third pin of the eight-pin time-base integrated circuit is serially connected to a LED light; and an eighth pin of the eight-pin time-base integrated circuit is connected to a voltage stabilizing circuit composed of voltage stabilizing diode and a third capacitor.

4. The power-generating device according to claim 3, wherein the positive electrodes and the negative electrodes of the positive charge generating converter and the negative charge generating converter are opposite.

5. The empower-generating device according to claim 4, wherein at least two batteries are provided, and the batteries are serially connected to each other.

6. The power-generating device according to claim 5, wherein the first capacitor and the second capacitor are supercapacitors.

7. The power-generating device according to claim 6, wherein the first electrode and the second electrode alternately charge the first capacitor;

and the third electrode and the fourth electrode alternately charge the second capacitor.

* * * * *